United States Patent
Lee et al.

(10) Patent No.: US 8,583,158 B2
(45) Date of Patent: Nov. 12, 2013

(54) METHOD AND SYSTEM FOR SESSION PARTICIPATION THROUGH CHAT POC GROUP INVITATION RESERVATION IN POC SYSTEM

(75) Inventors: Ji-Hye Lee, Seoul (KR); Sang-Kyung Sung, Seoul (KR); Wuk Kim, Gwacheon-si (KR); Hyeon-Cheol Pu, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1619 days.

(21) Appl. No.: 11/591,985

(22) Filed: Nov. 2, 2006

(65) Prior Publication Data

US 2007/0100941 A1 May 3, 2007

(30) Foreign Application Priority Data

Nov. 2, 2005 (KR) .......................... 10-2005-0104554

(51) Int. Cl.
*H04B 7/00* (2006.01)
(52) U.S. Cl.
USPC .......................................... 455/519; 455/518
(58) Field of Classification Search
USPC ............... 455/518, 558, 519, 405, 414.1, 440, 455/422.1, 550.1, 435.1, 452.1, 512, 418; 709/228; 370/252, 254, 255, 260, 352, 370/261, 277, 328, 329, 349, 331, 390, 392, 370/395.2

See application file for complete search history.

(56) References Cited

U.S. PATENT DOCUMENTS

| | | | |
|---|---|---|---|
| 7,688,764 B2 | 3/2010 | Dorenbosch et al. | |
| 2001/0020253 A1* | 9/2001 | Arao | 709/228 |
| 2003/0235184 A1* | 12/2003 | Dorenbosch et al. | 370/352 |
| 2004/0224710 A1* | 11/2004 | Koskelainen et al. | 455/518 |
| 2005/0113123 A1* | 5/2005 | Torvinen | 455/519 |
| 2005/0186970 A1 | 8/2005 | Yates et al. | |
| 2006/0211450 A1* | 9/2006 | Niekerk et al. | 455/558 |
| 2007/0054686 A1* | 3/2007 | Allen et al. | 455/518 |
| 2007/0100941 A1* | 5/2007 | Lee et al. | 709/204 |
| 2008/0248826 A1* | 10/2008 | Holm | 455/518 |
| 2009/0054097 A1* | 2/2009 | Kim et al. | 455/518 |
| 2009/0131092 A1* | 5/2009 | Kaida | 455/518 |

FOREIGN PATENT DOCUMENTS

| | | |
|---|---|---|
| KR | 1020040105884 A | 12/2004 |
| KR | 1020050013227 | 2/2005 |
| KR | 1020060081964 A | 7/2006 |
| WO | WO 01/67674 A2 | 9/2001 |
| WO | WO 03/069946 A1 | 8/2003 |

* cited by examiner

*Primary Examiner* — Edward Urban
*Assistant Examiner* — Golam Sorowar
(74) *Attorney, Agent, or Firm* — The Farrell Law Firm, P.C.

(57) ABSTRACT

Disclosed are a method and a system in which a client intending to participate in a chat Push-to-talk over Cellular (PoC) group, presents a session participation-invitation reservation to a server when the number limit has been exceeded pursuant to the policy of the chat PoC group, or when a chat PoC group ID exists but a corresponding session has not been initiated. Herein, when a client intending to participate in a chat PoC group receives a response indicating participation is not possible because the number limit of the chat PoC group has been exceeded, the client performs invitation reservation until participation is possible.

18 Claims, 7 Drawing Sheets

```xml
<?xml version="1.0" encoding="UTF-8"?>
<xs:schema targetNamespace="urn:oma:params:xml:ns:poc:poc-settings"
 xmlns="urn:oma:params:xml:ns:poc:poc-settings"
 xmlns:xs="http://www.w3.org/2001/XMLSchema"
 elementFormDefault="qualified"
 attributeFormDefault="unqualified">

<xs:import namespace="http://www.w3.org/XML/1998/namespace"
 schemaLocation="http://www.w3.org/2001/xml.xsd"/>
  <xs:annotation>
    <xs:documentation xml:lang="en">
XML Schema Definition in support of ... and Inv-Resv for NW-intiated PoC Session in the PoC service.
    </xs:documentation>
  </xs:annotation>

<xs:element name="poc-settings" type="poc-settingsType"/>
  <xs:complexType name="poc-settingsType">
    <xs:sequence>
    // INCLUDING ANOT POC-SETTINGS, SKIPPED
      <xs:element name="inv-resv" type="invresvSettingType"
         minOccurs="0"maxOccurs="unbounded"/>
      <xs:any namespace="##other" processContents="lax"
         minOccurs="0"maxOccurs="unbounded"/>
    </xs:sequence>
    <xs:anyAttribute namespace="##other"/>
  </xs:complexType>
...

<xs:complexType name="invresvSettingType"> // INV-RESV in poc-service settings
  <xs:sequence>
   <xs:element name="note"type="xs:string" minOccurs="0"/>
   <xs:element name="group"type="groupType" maxOccurs="unbounded"/>
   <xs:element name="resv-trig"type="invtrigType" maxOccurs="unbounded"/>
  </xs:sequence>
</xs:complexType>

<xs:complexType name="groupType"> // GROUP TYPE
 <xs:sequence>
```

FIG.6A

```xml
        <xs:element name="display-name" type="xs:string"minOccurs="0"/>
        <xs:element name="uri"type="xs:anyURI" maxOccurs="unbounded"/>
        <xs:any namespace="##other"processContents="lax"
            minOccurs="0"maxOccurs="unbounded"/>
    </xs:sequence>
    <xs:attribute name="type" use="optional">
      <xs:simpleType>
       <xs:restriction base="xs:string">
        <xs:enumeration value="chat"/>
        <xs:enumeration value="pre-arranged"/>
        <xs:enumeration value="adhoc"/>
        <xs:enumeration value="other"/>
       </xs:restriction>
      </xs:simpleType>
    </xs:attribute>
   <xs:anyAttribute namespace="##other"/>
 </xs:complexType>

<xs:complexType name="invtrigType"> // TRIGGERING EVENT TYPE
    <xs:attribute name="event" use="optional">
       <xs:simpleType>
        <xs:restriction base="xs:string">
         <xs:enumeration value="all-available"/>
         <xs:enumeration value="one-available"/>
         <xs:enumeration value="join-available"/>
         <xs:enumeration value="YYYY-MM-DD-HH-MM"/>
         <xs:enumeration value="other"/>
        </xs:restriction>
       </xs:simpleType>
     </xs:attribute>
    <xs:anyAttribute namespace="##other"/>
 </xs:complexType>

</xs:schema>
```

FIG.6B

METHOD AND SYSTEM FOR SESSION PARTICIPATION THROUGH CHAT POC GROUP INVITATION RESERVATION IN POC SYSTEM

PRIORITY

This application claims priority to an application entitled "Method And System for Session Participation Through Chat PoC Group Invitation Reservation in PoC System" filed in the Korean Intellectual Property Office on Nov. 2, 2005 and assigned Serial No. 2005-104554, the contents of which are incorporated herein by reference.

BACKGROUND OF THE INVENTION

1. Field of the Invention

The present invention relates to a method and a system in which a client, intending to participate in a chat Push-to-talk over Cellular (PoC) group, presents session participation-invitation reservation to a server when the number limit has been exceeded pursuant to the policy of the chat PoC group, or when a chat PoC group ID exists but a corresponding session has not been initiated.

2. Description of the Related Art

With the rapid development of mobile communication and the spread of communication networks, numerous services and applications using a cell phone have been provided. Further, as user requirements are varying, a service is being developed from a simple communication service to such services as a location, a multimedia and a Push-To-Talk (PTT) service. Specifically, a PTT service supports various supplementary functions including instant messenger and a state indication, as well as group and voice communication which can be provided by the conventional radio or Trunked Radio System (TRS).

Recently, there has been active discussion regarding the standard establishment for a PoC service in which such a PTT concept is provided through a mobile communication network. According to the characteristics of a PoC service distinguished from an existing mobile communication service, a user belonging to multiple sessions can perform communication while navigating among the sessions. The requirements for this concurrent communication and navigation have been clearly defined in the Open Mobile Alliance (OMA).

According to a chat PoC session participation scenario, there may exist various reasons for which normal session participation is impossible, such as when the number limit of a chat PoC group stipulated in the policy of the chat PoC group has been exceeded or when the ID of the chat PoC group exists but a session has not been initiated. As described above, when the normal session participation of a client is impossible, the client must repeat a session participation request in order to participate in a session. Therefore, the Quality of Experience (QoE) of a transmission-side PoC client may significantly deteriorate.

SUMMARY OF THE INVENTION

Accordingly, the present invention has been made to solve the above-mentioned problems occurring in the prior art, and it is an object of the present invention to provide a method and a system in which, when a client intending to participate in a chat PoC group receives a response indicating participation is not possible because the number limit of the chat PoC group has been exceeded, the client performs invitation reservation until participation is possible.

It is another object of the present invention to provide a method and a system in which, when a client intending to participate in a chat PoC group cannot participate in the chat PoC group because the ID of the chat PoC group exists but a session is not in progress, the client performs invitation reservation until participation is possible.

In order to accomplish the aforementioned object, according to the present invention, there is provided a Push-to-talk over Cellular (PoC) system for session participation through chat PoC group invitation reservation, the PoC system including a PoC client for transmitting a session participation message for the chat PoC group invitation reservation to a reception-side PoC server of a corresponding chat PoC group through a transmission-side PoC server; and the reception-side PoC server for receiving the session participation message, continuously determining whether the PoC client goes into a state where the PoC client can participate in a chat PoC group session, and transmitting a message, which notifies session participation, to the PoC client when the PoC client goes into the state where the PoC client can participate in the chat PoC group session.

In order to accomplish the aforementioned object, according to the present invention, there is provided a Push-to-talk over Cellular (PoC) system for session participation through chat PoC group invitation reservation, the PoC system including a PoC client for determining whether an invitation reservation function has been set when an error response message reporting that participation to a chat PoC group session is impossible is received, and transmitting a session participation request message for invitation reservation to a reception-side PoC server of a corresponding chat PoC group through a transmission-side PoC server when the invitation reservation function has been set; and the reception-side PoC server for continuously determining whether the PoC client goes into a state where the PoC client can participate in the chat PoC group session when the session participation request message is received, and transmitting a message which notifies session participation, to the PoC client when the PoC client goes into the state where the PoC client can participate in the chat PoC group session.

In order to accomplish the aforementioned object, according to the present invention, there is provided a method for participating in a chat Push-to-talk over Cellular (PoC) group session through chat PoC group invitation reservation in a PoC system, including transmitting, by a PoC client, a session participation request message for the chat PoC group invitation reservation to a reception-side PoC server of a corresponding chat PoC group through a transmission-side PoC server; when the session participation request message is received, determining, by the reception-side PoC server, whether the PoC client goes into a participation state where the PoC client can participate in a chat PoC group session; and when the PoC client cannot participate in the chat PoC group session, continuously determining, by the reception-side PoC server, whether the PoC client goes into the participation state and, when the PoC client goes into the participation state, transmitting a message which notifies session participation, to the PoC client.

In order to accomplish the aforementioned object, according to the present invention, there is provided a method for participating in a chat Push-to-talk over Cellular (PoC) group session through chat PoC group invitation reservation in a PoC system, including determining, by a PoC client, whether an invitation reservation function has been set when an error response message reporting that participation to a chat PoC group session is not possible is received, transmitting, by the PoC client, a session participation request message for invitation reservation to a reception-side PoC server of a corresponding chat PoC group through a transmission-side PoC server, when the invitation reservation function has been set, and continuously determining, by the reception-side PoC server, whether the PoC client goes into a participation state where the PoC client can participate in the chat PoC group session, when the session participation request message is received, and transmitting a message which notifies session participation, to the PoC client when the PoC client goes into the participation state.

According to the present invention, a PoC client is a device for interface with a user, and includes a key input unit for outputting specific key input data according to input of keys provided therein. Further, the PoC client includes a data transmitter for performing data transmission/reception with a PoC server, and a display unit for displaying media data received through the data transmitter, and displaying data output through the key input unit. Further, the PoC client includes a controller which controls data transmission/reception of the PoC client, controls display of data and generates and transmits an invitation reservation message for chat PoC group participation. Furthermore, the PoC client includes a storage unit for storing information relating to the general functions of a terminal, and storing both user ID for data relating to the support of a PoC service and terminal identification and information set by a user or provided from a server.

BRIEF DESCRIPTION OF THE DRAWINGS

The above and other objects, features and advantages of the present invention will be more apparent from the following detailed description taken in conjunction with the accompanying drawings, in which:

FIGS. 6A and 6B are diagrams illustrating the schema of an XML document within a message transmitted from a client to a corresponding CF in order to perform invitation reservation for chat PoC group participation according to the present invention.

DETAILED DESCRIPTION OF THE PREFERRED EMBODIMENT

Hereinafter, a preferred embodiment according to the present invention will be described with reference to the accompanying drawings. In the following description, the present invention is applied to a PoC system which provides a PTT service through a cellular mobile communication network, from among PTT systems. Generally, a PoC system uses a Session Initiation Protocol (SIP) protocol and an SIP extension protocol in order to transfer session participation information of group communication, and uses an XML Configuration Access Protocol (XCAP) protocol in order to acquire group information. The following functions of the present invention may be realized by the afore-described protocols. First, a conventional PoC system to which the present invention can be applied will be described.

Figure 1:
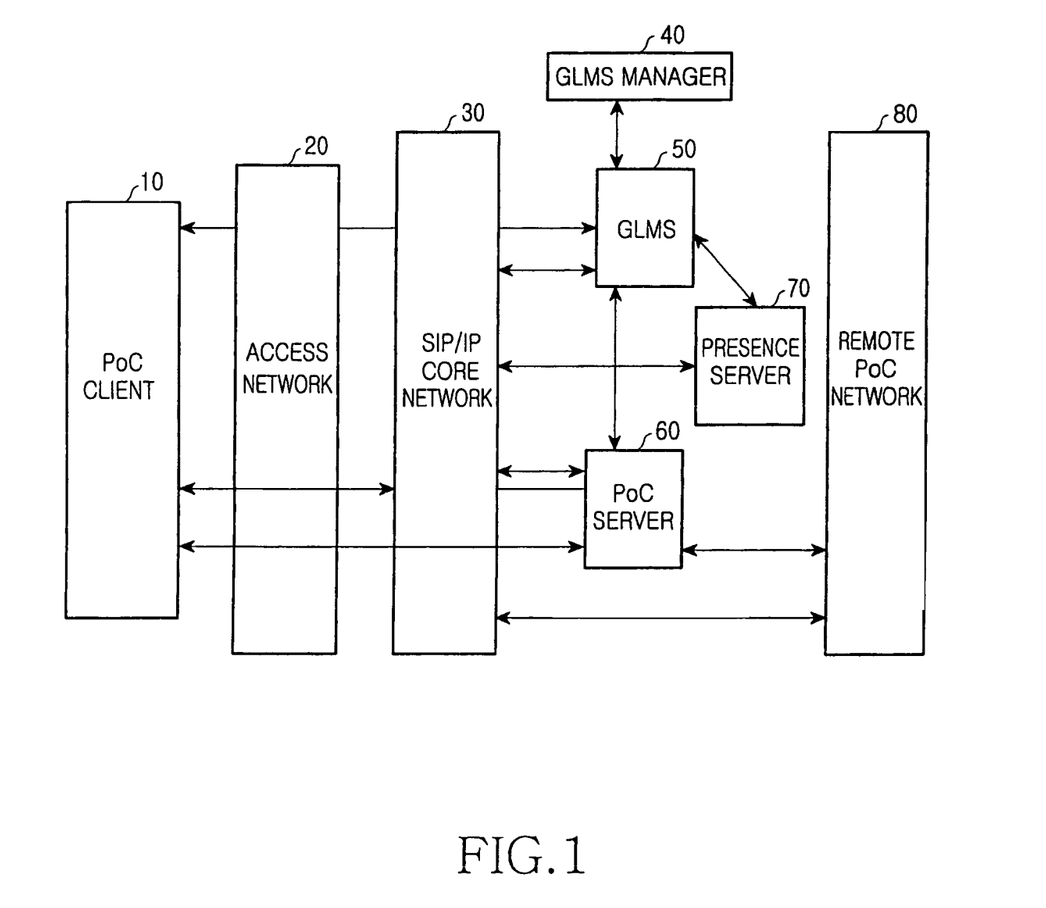
FIG. 1 is a diagram of the structure of a conventional PoC service system.

FIG. 1 is a diagram of the basic structure of a conventional PoC. Referring to FIG. 1, a PoC client 10 represents a service requester mounted in a mobile terminal, and is connected to an SIP/IP core network 30 that supports SIP and IP multimedia, through an access network 20.

The PoC client 10 enables access to a PoC service to be accomplished while staying in a PoC client terminal. The main functions of the PoC client 10 are to generate a PoC in view of a PoC client, participate in an existing session, and end the session. In addition, the PoC client 10 generates and transfers a talk burst, supports an instant personal alert, executes authentication when accessing the PoC service, among other functions. Hereinafter, unless stated otherwise, the term "the PoC client 10" will refer to a PoC service subscriber.

An SIP/IP-based core network is connected to a PoC server 60, a Group List and Management System (GLMS) 50, a presence server 70, in order to provide the service.

The GLMS 50 stores information of a PoC service subscriber, interworks with a PoC server, and transfers information of a subscriber (the ID of a subscriber, a terminal number, group information).

The presence server 70 stores state information including whether a PoC service subscriber is in an online state, and the location of the PoC service subscriber. The presence server 70 registers and maintains the current location of a user in an online state, and provides this information to users who want to receive the information, thereby enabling a communication service to be immediately provided.

The PoC server 60 performs a Controlling PoC Function (CF) for maintaining and managing a PoC session, or has a Participating PoC Function (PF) for participating in a PoC session which is initiated for communication of one-to-one or one-to-many persons.

The PoC server 60 performs both the CF for generally maintaining and managing a PoC session and the PF for conducting maintenance of sessions.

Hereinafter, the CF and the PF will be described in more detail with reference to Tables 1 and 2 below.

TABLE 1

Controlling PoC Function (CF)

Provides centralized PoC session handling
Provides the centralized Media distribution
Provides the centralized talk burst arbitration functionality including talker identification
Provides SIP session handling, such as SIP session origination, termination, etc.
Provides policy enforcement for participation in group sessions
Provides the participants information
Collects and provides centralized media quality information
Provides centralized charging reports
May provide transcoding between different codecs
Support talk burst control protocol negotiation As illustrated in Table 1, the CF generally manages a PoC session from among the functions of the PoC server. Specifically, the CF receives the floor (the right to speak) request from PoC clients, determines an order, assigns authority to the PoC clients, distributes talk bursts, which a certain client has requested, to all clients participating in group call, and provides information of the clients participating in the group call.

The PF manages sessions relating to the CF and each client in a PoC session as illustrated in Table 2. Specifically, when a client requests the right to speak or the CF assigns the right to speak to a client, the PF performs a relay function. Further, the PF relays media between the CF and a client, and performs transcoding when the CF and the client use different codecs. In addition, in simultaneous sessions, when communication is performed in one session, if communication is also performed in another session, the PF filters one of the sessions according to the selection of a PoC client.

TABLE 2

Participating PoC Function (PF)

Provides PoC session handling
May provide the media relay function between PoC client and controlling PoC server
May provide user media adaptation procedures
May provide the talk burst control message relay function between PoC client and controlling PoC server
Provides SIP session handling, such as SIP session origination, termination, etc. on behalf of the represented PoC client
Provides policy enforcement for incoming PoC session (e.g. access control, incoming PoC session barring, availability status, etc)
May collect and provide media quality information
Provides the participant charging reports
May provide filtering of the media streams in the case of simultaneous sessions
May provide transcoding between different codecs
May support talk burst control protocol negotiation
Stores the current answer mode and incoming PoC session barring preferences of the PoC client In the PoC system having the construction as described above, a PoC client may input information on a group and group members to the GLMS 50 through its own terminal, or may learn information of PoC clients, which the PoC client may call, through a personal or group list received from the GLMS 50. Another method for performing generation, modification and management of a group and group members for the GLMS 50 is to input the group and the group members through a reliable communication network such as the Internet or Intranet.

In order to use a PoC call service in the PoC system, a PoC client registers its own PoC address in the SIP/IP core 30. Herein, the SIP/IP core 30 stores information on the PoC client based on the request of the PoC client. Accordingly, when another PoC client calls a PoC group, the PoC client registers its own information in the SIP/IP core 30, and then transmits a call request to the SIP/IP core 30 using group identification information received from the GLMS 50. The SIP/IP core 30 performs address determination and domain location determination processes using information on the PoC client which has transmitted the call request, and transfers a PoC communication request to a home PoC server in which the request PoC client has been registered. The PoC server 60 prepares to initiate a PoC session in response to the PoC communication request, acquires each piece of user information from the GLMS 50, and transfers communication request signals to the corresponding SIP/IP core 30. Herein, when the communication request corresponds to a communication request for users within an intradomain, the PoC server 60 performs all functions of the PF and the CF. The PoC server 60 for managing a PoC client, which has received a communication request, uses information of the PoC client, which is transferred to the PoC server 60, and transmits a communication request to the PoC client after the location determination process of SIP/IP core 30.

A call processing procedure for PoC communication setup, which enables communication to be performed according to the communication request as described above, may include various procedures according to the requests of a transmission-side and a reception-side and preset situations. A the PoC system has the following characteristics.

The reception-side may set its own response mode at the request of a PoC client, and the response mode may be largely classified as an automatic or a manual response mode.

In the automatic response mode, if the reception-side is included in a PoC client list designated by a reception-side PoC user, a corresponding network immediately transmits a response to the transmission-side on behalf of the manual response of a receiver. As described above, the network transmits the automatic response on behalf of the operation of a terminal because a PoC server has a function for storing a response mode and a corresponding user list according to a response mode setup request from a terminal. The manual response mode is applied when the reception-side is not included in an automatic response user list or is obscure, or when a reception-side PoC user has set a response mode as a manual response mode for all users requiring a response. Accordingly, a PoC communication request is transmitted to a user's terminal via a reception network, and communication is connected by the permission of a PoC client.

Second, the PoC system may have an on-demand session mode and a pre-established session mode according to whether connection setup with a PoC server within a home network of a user has been established.

The on-demand session mode represents a state in which a PoC client has not set a pre-established session, and corresponds to a mode in which a PoC call connection procedure is performed after an invitation message is received from another PoC client.

The pre-established session mode corresponds to a mode in which a PoC client sets a specific session in advance between the PoC client and a PoC server within its own home network at its own request. Such a pre-established session mode is necessary when the PoC client pre-negotiates a media parameter to be used by the PoC client with the PoC server, and rapidly performs communication setup without renegotiation of a media parameter to be used later between a server and a client. The setup of a pre-established session is accomplished when the PoC client provides a spatial data provider (SDP) server with a supported media parameter through the method of an SIP invite, and responds to a media parameter provided from a server. Further, a conference uniform resource identifier (URI) is inserted into a response message from a server as identification information of a newly set pre-established session, and is fedback to the PoC client. When such a pre-established session is used, it is possible to preset such functions as an IP address, a port number, a codec to be used and a talk burst control protocol.

Standardized PoC specifications have the following special characteristics in addition to the basic functions of a communication system as described above.

First, the PoC system sends an automatic preset response to a permitted PoC client, regardless of a response mode of a PoC receiver, and supports a Manual Answer Override (MAO) mode in which a reception terminal connects communication. The request of an MAO is supported only to a permitted communication requester, and an MAO indicator is included in a PoC communication request message INVITE and transferred. Such an MAO request may be a PoC function suitable for both an urgent purpose including an accident, disaster and a command, as well as a public service. However, such an MAO may be selectively accomplished according to operators in a standard document. Further, even if a PoC client supports the MAO in a home network to which the PoC client belongs, if a counterpart network does not support the MAO, the MAO does not operate.

Next, the setup of a response mode for a communication request in the PoC system may be stored in both a PoC server, which corresponds to an element on a network, and a PoC client which corresponds to a terminal of a user-side. Specifically, when setting a response mode in a home network for managing a PoC client, a response mode is accomplished in the PoC server for performing the PF within the home network including the PoC client. When the response mode of a network-side is set, and PoC communication is requested from, another PoC server, the PF immediately and automatically transmits a session progress message to a communication request network, so that a communication request procedure can be simplified, as compared to a procedure in which a session setup message is transferred to the PoC client and a response is accomplished.

The PoC system as described above supports group calls as well as personal calls (one-to-one call). The group call may include an ad-hoc, a pre-arranged and a chat group call. In the ad-hoc group call, a user randomly selects multiple persons, with whom the user wants to communicate, from a user's contact list, and performs the group call. In the pre-arranged group call, when one user has previously registered the names of members under a group name and has performed a call using the group name, only the members are called. In the chat group call, when a user has initiated a chat room, all users interested in the chat room can participate in chatting. Hereinafter, a process for participating in the session of a preset chat group will be described with reference to FIGS. 2 to 4. Further, a chat group in the PoC system will be referred to as a chat PoC group.

Figure 2:
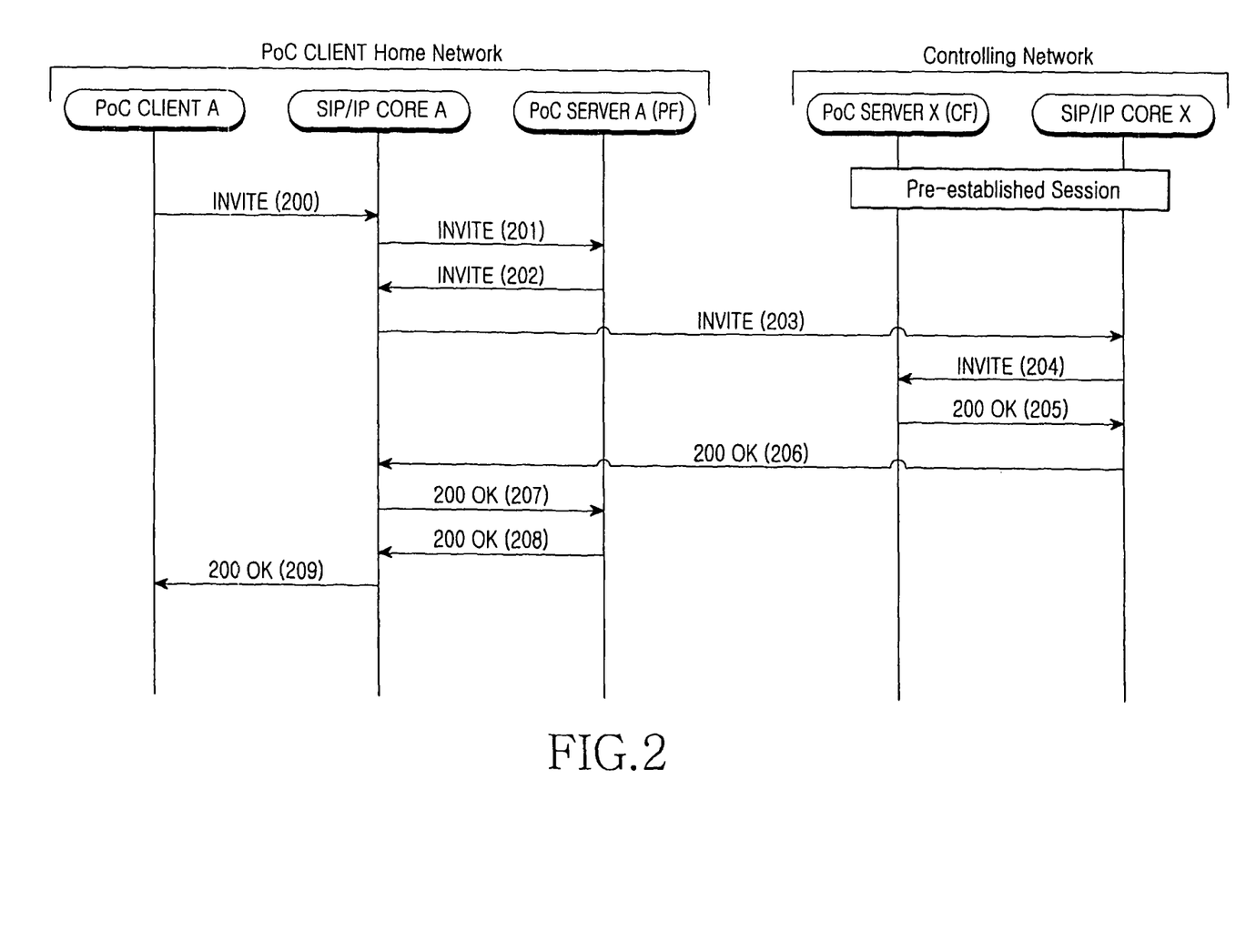
FIG. 2 is a diagram illustrating a conventional process in which a PoC client succeeds in participating in a chat PoC group session.

FIG. 2 is a diagram illustrating a conventional method for participating in the session of a chat PoC group in progress at the request of a transmission-side PoC client.

Referring to FIG. 2, in step 200, a PoC client A sends an invitation request message INVITE including chat PoC group ID information to an SIP/IP core A. Herein, a session participation request message includes an element such as PoC address information of a communication request client, a required media parameter and information on a characteristic value reporting a PoC service. In step 201, such a session participation request message is transferred to a PoC server A "PF A", which conducts a participating function, from the SIP/IP core A through a path query in a dynamic host configuration protocol (DHCP) server or a domain name system (DNS) server via a corresponding server (P-CSCF and S-CSCF) within an IP multimedia subsystem (IMS) network. In step 202, the PoC server A transfers the received session participation request message to an SIP/IP core X of a corresponding control network. In step 204, the SIP/IP core X transfers the received session participation request message to a PoC server X "CF X". Herein, in a conventional communication request, the PF A, to which the PoC client A is connected, may be realized separately from the CF X for performing a control function, which manages the talk burst of an initiated session.

The SIP/IP core X receives a response message for the session participation request message, which has been transferred in step 204, from the CF X. A response SIP message in a reception-side network may include, for example, a provisional response message of 1XX, a successful response message of 2XX and an error response message of 4XX to 6XX. However, in the present invention, a conventional call processing procedure will be mainly described. Herein, the CF X may receive an auto-answer response or an OK response, according to reception-side response modes. In FIG. 2, in the auto-answer response, the CF X may receive SIP 183 'session progress' signals. In this manner, it is possible to perform connection between a PoC server and a client in the IMS network of a communication requester. The communication permission signals of a receiver are replied as the SIP 183 'session progress' or an SIP 200 'OK' response, and are transferred to the PoC client A via the PoC server of the CF and the PF through steps 206 to 209.

FIG. 2 shows the conventional session participation procedure of the chat PoC group. However, as when the number limit of a chat PoC session according to the chat PoC group policy has been exceeded, or when a session which corresponds to the chat PoC group ID included in a session participation request message requested by a client, is not in progress, there may occur environments in which the PoC session participation request of a transmission-side client fails.

Figure 3:
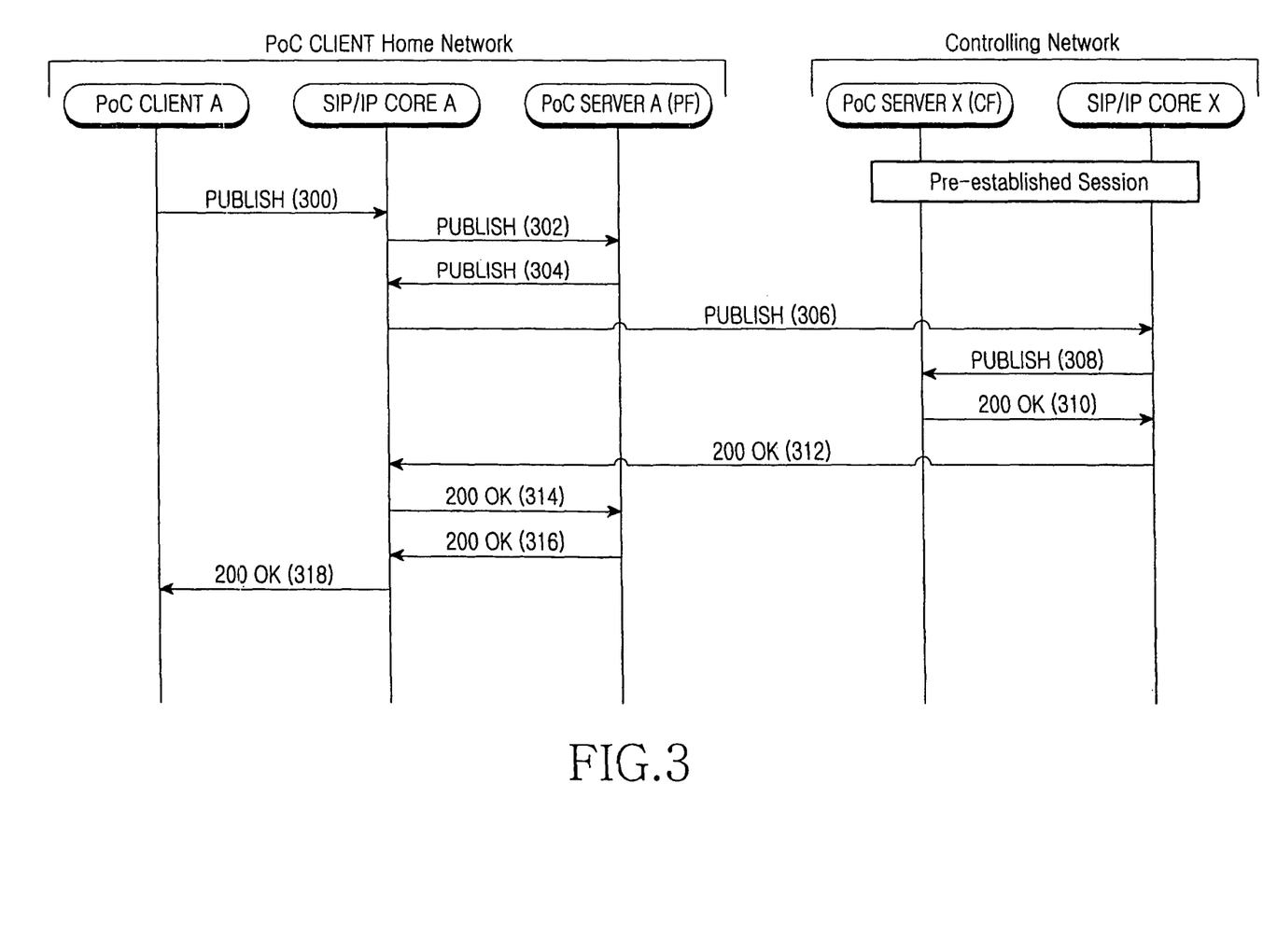
FIG. 3 is a diagram illustrating a conventional process in which a PoC client succeeds in participating in a chat PoC group session using a publish method.

FIG. 3 is a diagram illustrating a conventional method for participating in the session of a chat PoC group in progress using a publish method at the request of a transmission-side PoC client.

A PoC client A, which requests chat PoC communication, transmits a service request message PUBLISH for initiating a session to a PoC server A of its own home PoC network. Herein, an SIP message transferred through the publish method corresponds to a PoC session initiation request message, and includes an event header. A header field value, which reports that PoC session initiation has been requested by the PF, is sent though the event header. The detailed content of the PUBLISH message for the event header value, e.g. a type including initiation time of a PoC session and presence information when a session is initiated, is set through the content-type header within an SIP message. For example, when the field value of the event header has been set as session initiation time, a content-type is set as a text/plain value or an application/xml value. Herein, a corresponding content message may be set as YYYY-MM-DD-HH-MM-SS.

Referring to FIG. 3, the PUBLISH message generated by the PoC client A is transferred to a controlling PoC server X (CF) via an SIP/IP core A, a PoC server A (PF) and a SIP/IP core X through steps 300, 302, 304, 306 and 308. The address of a corresponding PoC server, which is inserted into the PUBLISH message by the PoC client A, is used for a request-URI, and is transferred to a corresponding PoC server through an SIP/IP core network using such address information. When ad hoc PoC group communication or PoC session initiation for a simple PoC client is requested, the participating PoC server of the PoC client A simultaneously performs the functions of the PF and the CF.

The CF, which has received the PUBLISH message for PoC initiation from the PoC client A, determines that the request is permitted, and transmits a response message SIP 200 OK to the PoC client A through steps 310, 312, 314, 316 and 318.

Figure 4:
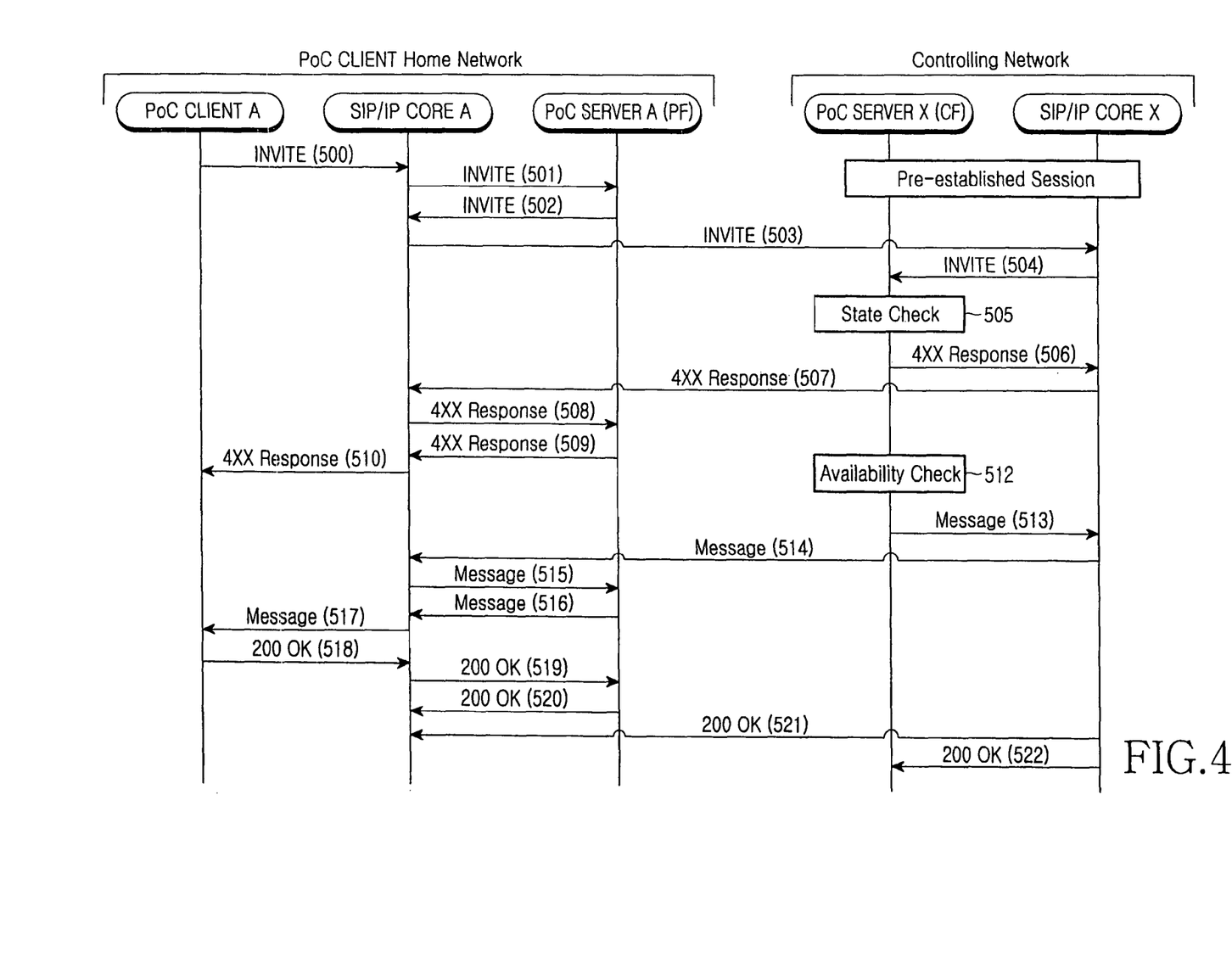
FIG. 4 is a diagram illustrating a process in which a PoC client performs invitation reservation when a PoC client fails to participate in a chat PoC group session according to the present invention.

FIG. 4 is a diagram illustrating a process in which, where a PoC client requests participation to a chat PoC group session, the PoC client performs invitation reservation for participating in the chat PoC group session using invitation reservation information according to the present invention. When a client intending to participate in a chat PoC group, receives a response indicating participation is not possible because the number limit of a chat PoC group has been exceeded, a process for performing invitation reservation until participation is possible will be described with reference to FIG. 4.

Referring to FIG. 4, in step 500, a PoC client A sends a session participation request message including chat PoC group ID information to an SIP/IP core A. Herein, the session participation request message includes invitation reservation information, in addition to an element such as PoC address information of an existing communication request client, a required media parameter, and information on a characteristic value reporting a PoC service. Herein, the invitation reservation information is information used for invitation reservation until participation to a chat PoC group becomes possible.

In step 501, the SIP/IP core A transfers the session participation request message to a PoC server A "PF A", which conducts a participating function, through a path query in a DHCP server or a DNS server via a corresponding server (P-CSCF and S-CSCF) within an IMS network. In a general communication request, the PF A, to which the PoC client A is connected, may be realized separately from a PoC server X "CF X" for performing a control function, which manages the talk burst of an initiated session. Accordingly, the session participation request message sent in steps 500 and 501 is transferred to the CF X via the SIP/IP core networks of each network in steps 502 to 504.

A response SIP message in a reception-side network may include a provisional response message of 1XX, a successful response message of 2XX, an error response message of 4XX to 6XX, according to whether a corresponding server exists on the server-side, whether a session is in-progress, or the number of participants: Since the present invention relates to when a session is not in progress or the number limit has been exceeded, a procedure for transferring the following error response message will be described.

If the session participation request message is received in step 504, the CF X performs a state check step for determining whether participation of a client is possible in step 505. In such a state check step, the CF X communicates with an X display manager (XDM) server, receives information on the number limit stipulated in a corresponding chat PoC group policy, compares the number limit with the actual number of session participants, and determines whether additional participation to the corresponding session is possible. Further, the CF X also determines whether the corresponding session is being progressed by a corresponding chat PoC group. An OMA standard defines an XDM Server (XDMS) for a group list service. Information on a group and group members may be input to the XDMS through a PoC client. The PoC client may learn information of PoC clients, which the PoC client may call, through a personal or group list received from the XDMS. The generation, modification and management of a group and group members for the XDMS may also be accomplished through a reliable communication network, such as the Internet or Intranet. Herein, details about a protocol and detailed content of XML document management including the generation, modification and deletion of a group list will be omitted for the sake of clarity and conciseness.

In the state check in step 505, when one or more of the two conditions are not satisfied, the CF X transfers an error response message to the PoC client A via each SIP/IP core network and PF A in steps 506 to 510, wherein the error response message reports that session participation is not possible. When the number limit of a corresponding chat PoC group session has been exceeded, an SIP 486 "busy here" message may be transferred as the error response message. When there is no session in progress in a corresponding chat PoC group, an SIP 488 "not acceptable here" message may be transferred as the error response message.

After transmitting the error response message to the corresponding PoC client A, the CF X inserts the corresponding PoC client A into an invitation reservation waiting list for storage. In step 512, the CF X performs an availability check step for determining whether session participation is possible.

If the session participation becomes possible in step 512, the CF X transmits a session participation-possible notification message to the PoC client A, which is standing by, via each SIP/IP core network and PF A in steps 513 to 517. That is, a case may occur in which the number of session participants falls below the number limit of a corresponding chat PoC group session, or a session has been initiated in a corresponding chat PoC group. If the session participation becomes possible as described above, when there are multiple clients who are standing by, the CF X may preferentially transmit the session participation notification message to a client having first performed reservation. Further, if previously set priority information exists in clients, it may also be possible to follow the priority. When a corresponding client has not been registered in a PoC service and an IMS system, the message may also be notified through a messaging service of an existing mobile communication network including a short message service (SMS) and a multimedia messaging service (MMS).

After the PoC client A receives the session participation-possible notification message, if the PoC client A transmits response message an SIP 200 OK via each SIP/IP core network and PF A in steps 518 to 522, participation to the corresponding chat PoC group is completed.

As described above, the session participation request message including an invitation reservation parameter used for participating in the chat PoC group session, is received from a client, it is determined whether session participation is possible. When it is not possible, a continuous determination of whether the session participation becomes possible is performed. As a result of the check, if the session participation becomes possible, a client who is standing by, can directly participate in a session.

Accordingly, when a client cannot normally participate in a session, it is not necessary to repeatedly transmit a session participation request message in order to participate in the session. Hereinafter, a process in which, when a PoC client transmits a session participation request message in order to participate in a chat PoC group session, and then receives an error response message in order not to change the header value or MIME parameter of an existing, session participation request message, the PoC client performs invitation reservation using the SIP publish method until session participation becomes possible, will be described in detail with reference to FIG. 5.

Figure 5:
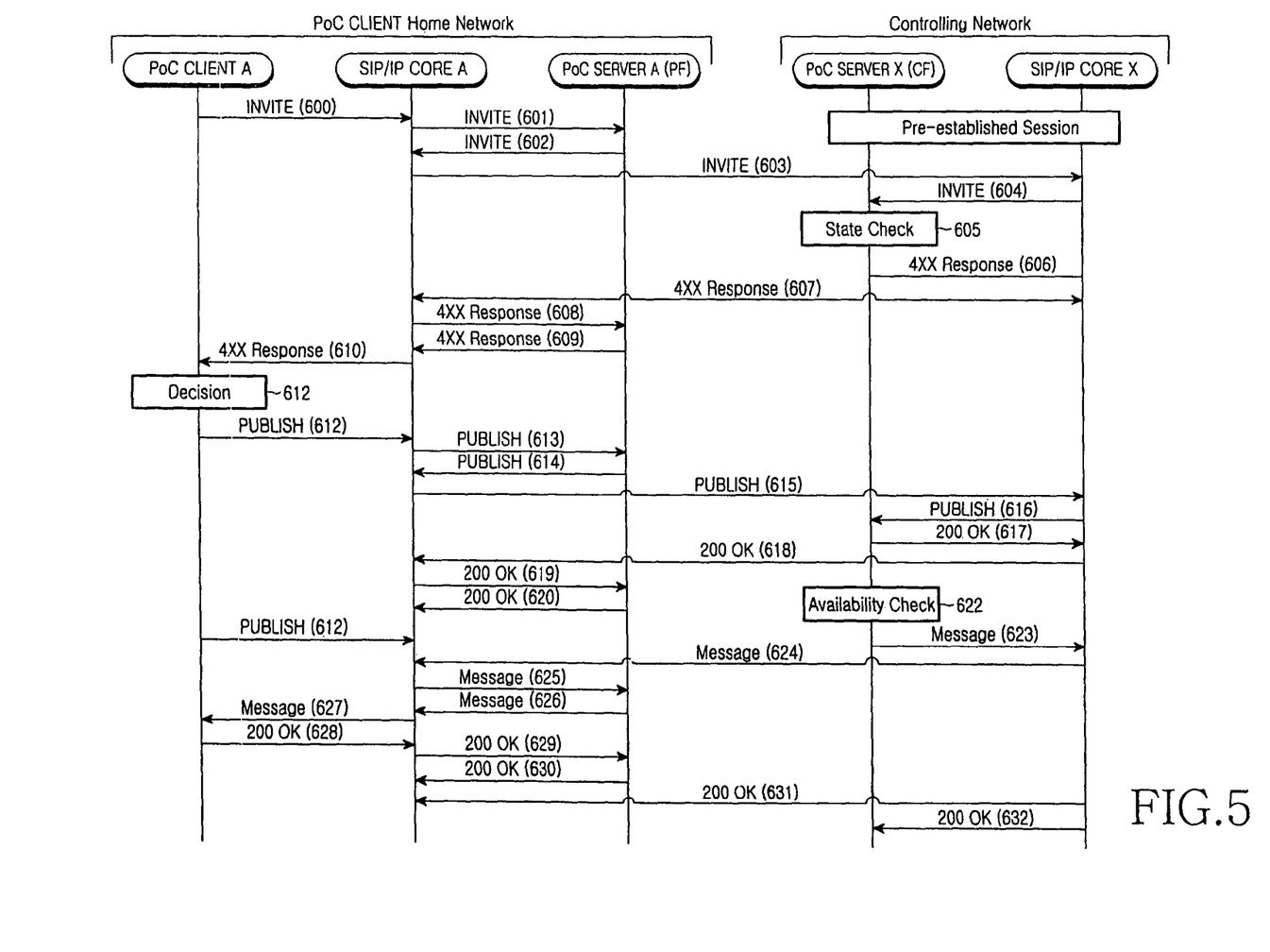
FIG. 5 is a diagram illustrating a process in which a PoC client performs invitation reservation using a publish method when a PoC client fails to participate in a chat PoC group session according to the present invention.

FIG. 5 is a diagram illustrating a progress for requesting invitation reservation for participating in a chat PoC group session using a PUBLISH message when a PoC client receives an error response message for a chat PoC group session participation request according to the present invention. In step 600, a PoC client A sends a session participation request message including chat PoC group ID information to a SIP/IP core A. Herein, the session participation request message includes an element such as PoC address information of a communication request client, a required media parameter, and information on a characteristic value reporting a PoC service.

In step 601, the SIP/IP core A transfers the session participation request message to a PoC server A "PF A", which conducts a participating function, through a path query in a DHCP server or a DNS server via a corresponding server (P-CSCF and S-CSCF) within an IMS network. In a general communication request, the PF A, to which the PoC client A is connected, may be realized separately from a PoC server X "CF X" for performing a control function, which manages the talk burst of an initiated session. Accordingly, the session participation request message transmitted in steps 600 and 601 is transferred to the CF X via the SIP/IP core networks of each network in steps 602 to 604.

If the session participation request message is received in step 604, the CF X determines whether a client can currently participate in a session in step 605.

That is, in step 605, the CF X communicates with a XDM server, receives information on the number limit stipulated in a corresponding chat PoC group policy, compares the number limit with the actual number of session participants, and determines whether additional participation to the corresponding session is possible. Further, the CF X also determines whether there exists a session being progressed by a corresponding chat PoC group.

The CF X transmits a response message according to the results of the determination in step 605. Such a response message may include a provisional response message of 1XX, a successful response message of 2XX and an error response message of 4XX to 6XX, according to whether a corresponding server exists on the server-side, whether a session is in progress, or the number of participants. Since the present invention relates to when a session is not in progress or the number limit has been exceeded, a procedure for transferring the following error response message will be mainly described.

As a result of the determination in step 605, when one or more conditions of the two conditions are not satisfied, the CF X transfers an error response message to the PoC client A via the SIP/IP core network and the PF A in steps 606 to 610. Herein, when the number limit of a corresponding chat PoC group session has been exceeded, the CF X may transfer an SIP 486 "busy here" message as the error response message. When there is no session in progress in a corresponding chat PoC group, the CF X may transfer an SIP 488 "not acceptable here" message as the error response message.

If the error response message is received in step 610, the PoC client A determines whether to reserve a chat PoC group session participation request in step 612.

If the PoC client A does not reserve the chat PoC group session participation request, the procedure follows the conventional participation request failure flow as illustrated in FIG. 3. However, if the PoC client A reserves the chat PoC group session participation request, the PoC client A transmits a service request for session participation to the PF A of its own home PoC network using an SIP PUBLISH message.

When there exists input of the PoC client A for reserving the chat PoC group session participation request in step 612, the PoC client A generates the SIP PUBLISH message including an invitation reservation parameter, and transfers the generated PUBLISH message to the CF X via a corresponding RF. A in steps 612 to 616. Herein, the address of a corresponding PoC server, which is inserted into the PUBLISH message by the PoC client A, is used for a request-URI, and is transferred to a corresponding PoC server through an SIP/IP core network using such address information. When ad hoc PoC group communication or PoC session initiation for a simple PoC client is requested, the participating PoC server of the PoC client A simultaneously performs the functions of the PF and the CF.

The CF X, which has received the PUBLISH message for PoC initiation from the PoC client A, determines that the request is permitted, and transmits a response message SIP 200 OK to the PoC client A through steps 623 to 627.

After transmitting the SIP 200 OK to the corresponding PoC client A, the CF X inserts the corresponding PoC client A into an invitation reservation waiting list for storage. In step 622, the CF X performs an availability check step for determining whether session participation is possible according to existence or absence of a preset event.

As a result of the check, if the session participation becomes possible, i.e. when the number of session participants falls below the number limit of a corresponding chat PoC group session, or a session has been initiated in a corresponding chat PoC group, the CF X transmits a session participation-possible notification message to the PoC client A, which is standing by, via each SIP/IP core network and PF A in steps 623 to 627. When a corresponding client has not been registered in a PoC service and an IMS system, the message may also be notified using a messaging service of an existing mobile communication network including an SMS and an MMS.

After the PoC client A receives the session participation-possible notification message, if the PoC client A transmits a response message SIP 200 OK via each SIP/IP core network and PF A in steps 628 to 632, participation to the corresponding chat PoC group is completed. When the PoC client has received the error response message reporting that that session participation is not possible, from the CF, the PoC client transmits the PUBLISH message including the invitation reservation parameter to a corresponding CF according to the selection of the invitation reservation function for waiting until the session participation becomes possible, so that it is possible to set the invitation reservation function until the session participation becomes possible.

Accordingly, when a client cannot normally participate in a session, it is not necessary to repeatedly transmit a session participation request message in order to participate in the session.

Figure 6B:
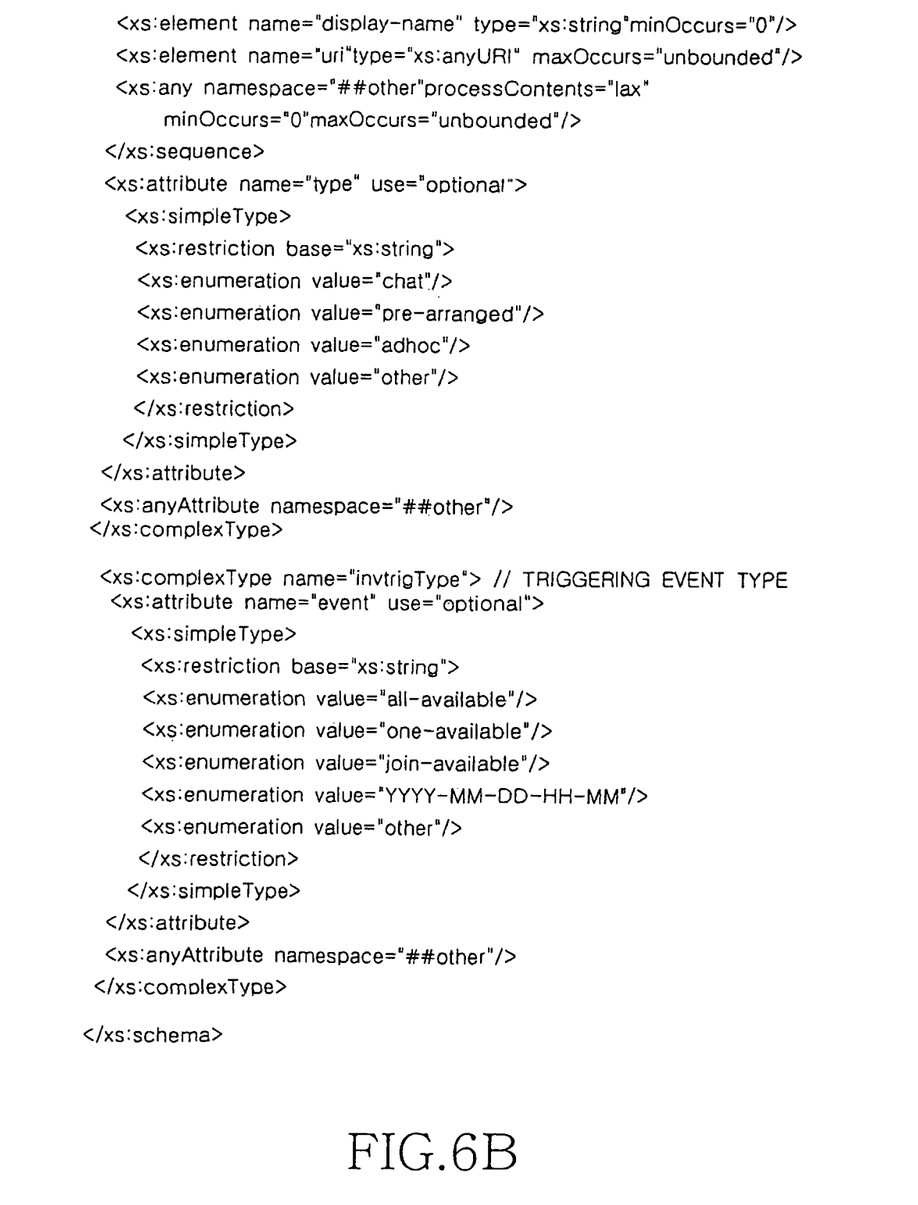

FIGS. 6A and 6B are diagrams illustrating the schema of an XML document within a message transmitted from a client to a corresponding CF in order to perform invitation reservation for chat PoC group participation according to the present invention.

Referring to FIGS. 6A and 6B, the schema of an XML document within the message, which is transmitted from a client to a corresponding CF in order to perform invitation reservation for the chat PoC group participation and supports a PoC group type and session initiation triggering event setup including PoC service setting supported by a conventional PoC system, is included in the SIP session participation request message in FIG. 4 or the SIP PUBLISH message in FIG. 5.

That is, the XML document included in the session participation request message or the PUBLISH message transmitted from the client to the CF to set a session participation invitation reservation function for a chat PoC group, may include an XML document having the values of both "chat" of "<xs:enumeration value="chat"/>" in a group type and "join-available" of "<xs:enumeration value="join-available"/>" in an invtrig type, as illustrated in FIGS. 6A and 6B.

Specifically, according to a method for allowing the session participation request and procedure for realizing the PoC service to be compatible with an existing PoC standard, a PoC client requesting the participation transfers information for session participation to a PoC group server, and the PoC server can perform a session connection procedure based on variously modified embodiments.

As described above, the present invention provides a method and a system in which a client intending to participate in a chat PoC group, performs session participation-invitation reservation for a server when the number limit has been exceeded pursuant to the policy of the chat PoC group, or when a chat PoC group ID exists but a corresponding session has not initiated, so that the client can easily participate later in the chat PoC group.

Further, a server assigns priority for chat PoC session participation to a client which is standing by after performing invitation reservation, so that session connection can be rapidly accomplished when participation to a corresponding session is possible.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A server for managing session participation in an existing session, by a plurality of clients connected to a Session Initiation Protocol/Internet Protocol (SIP/IP) core network, the server comprising:
   a transceiver for receiving a session participation message including a session invitation reservation for reserving participation in the existing session from a client of the plurality of clients; and
   a controller for identifying the session invitation reservation included in the received session participation message, for determining whether the existing session is in a state in which the client can participate in the existing session, according to the session invitation reservation, and if the client cannot participate in the existing session, for monitoring the existing session to determine whether the existing session goes into the state in which the client can participate in the existing session, and if the client can participate in the existing session, notifying the client of session participation.

2. The server of claim 1, wherein the session participation message comprises a communication request message, and includes at least one parameter of address information, required media, information on a characteristic value reporting a service, and an invitation reservation.

3. The server of claim 2, wherein the invitation reservation parameter is for performing invitation reservation until the existing session is in the state in which the client can participate in the existing session.

4. The server of claim 1, wherein the existing session is not in the state in which the client can participate in the existing session when the existing session is not in progress or when a number of participants participating in the existing session has exceeded a number limit.

5. The server of claim 1, wherein the existing session is in the state in which the client can participate in the existing session, when a number limit of the existing session has not been reached or when the existing session has been initiated.

6. A client for session participation in an existing session, the client comprising:
   a transceiver for transmitting a request message for session participation in an existing session and receiving an error response message when the session participation in the existing session is not possible;
   a controller for generating a session invitation reservation message used for reserving participation in the existing session when receiving the error response message, and transmitting the session invitation reservation message to a server corresponding to the existing session, through the transceiver, and for notifying the client of the session participation, when participation in the existing session is possible.

7. The client of claim 6, wherein the session participation request message comprises a session initiation request message, and includes an invitation reservation parameter for performing invitation reservation until participation in the existing session is possible.

8. The client of claim 6, wherein participation in the existing session is not possible, when the existing session is not in progress or when a number of participants participating in the existing session has exceeded a number limit.

9. The client of claim 8, wherein participation in the existing session is possible, when a number limit of the existing session has not been reached or when the existing session has been initiated.

10. A method for participating in an existing session through a Session Initiation Protocol/Internet Protocol (SIP/IP) core network by a server, the method comprising the steps of:
    receiving a session participation request message from a client, the session participation request message including a session invitation reservation for reserving participation in the existing session;
    checking if the existing session is in a state in which the client can participate in the existing session;
    continuously checking if the existing session enters into the state in which the client can participate in the existing session, when the client cannot participate in the existing session; and
    transmitting a message notifying session participation to the client, when the existing session is in the state in which the client can participate in the existing session.

11. The method of claim 10, wherein the session participation request message comprises a communication request message, and includes at least one parameter of address information, required media, information on a characteristic value reporting a service, and an invitation reservation.

12. The method of claim 11, wherein the invitation reservation parameter is for performing invitation reservation until the existing session is in the state in which the client can participate in the existing session.

13. The method of claim 10, wherein the existing session is not in the state in which the client can participate in the existing session, when the existing session is not in progress or when a number of participants participating in the existing session has exceeded a number limit.

14. The method as claimed in claim 13, wherein the existing session is in the state in which the client can participate in the existing session, when a number limit of the existing session has not been reached or when the existing session has been initiated.

15. A method for participating in a existing session through a Session Initiation Protocol/Internet Protocol (SIP/IP) core network, by a client, the method comprising the steps of:
    transmitting, by the client, a request message for session participation in an existing session to the server;
    receiving an error response message, when the session participation in the existing session is not possible;
    generating a session invitation reservation message for reserving participation in the existing session;
    transmitting the session invitation reservation message to a server corresponding to the existing session; and
    receiving a message notifying session participation, when participation in the existing session is possible.

16. The method of claim 15, wherein the session participation request message comprises a session initiation request message, and includes an invitation reservation parameter for performing invitation reservation until participation in the existing session is possible.

17. The method of claim 15, wherein the client cannot participate in the existing session when the existing session is not in progress or when a number of participants participating in the existing session has exceeded a number limit.

18. The method of claim 17, wherein the client can participate in the existing session, when a number limit of the existing session has not been reached or when the existing session has been initiated.

* * * * *